Patented Aug. 18, 1925.

1,550,321

UNITED STATES PATENT OFFICE.

WILBER K. NICHOLS AND ELSIE P. NICHOLS, OF LOS GATOS, CALIFORNIA.

METHOD OF MANUFACTURING CANDIED FRUITS.

No Drawing. Application filed October 22, 1924. Serial No. 745,123.

*To all whom it may concern:*

Be it known that we, WILBER K. NICHOLS and ELSIE P. NICHOLS, citizens of the United States, residing at Los Gatos, county of Santa Clara, and State of California, have invented new and useful Improvements in Methods of Manufacturing Candied Fruits, of which the following is a specification.

This invention relates to a method of manufacturing candied fruits by impregnating the fruit with a syrup solution obtained from sugar, saccharine, or a mixture of both.

Candied fruits are manufactured in great quantities, but the methods employed require boiling of the fruit in a syrup solution for a considerable length of time and both discoloration and change in flavor take place.

The object of the present invention is to generally improve and simplify this method; to reduce the time required; to improve the keeping qualities, and above all to retain color and natural flavor as much as possible.

The method forming the subject matter of the present application is accomplished as follows: The fruit to be candied, if raw or fresh, is suitably prepared; for instance, by stemming, pitting, peeling, washing, etc., as desired. The raw fruit is then placed in a syrup solution, which is heated to approximately 190° F; this temperature or any other temperature required being employed to insure pasteurization and complete destruction of any germs of fermentation which may be present in the fruit. The solution is then permitted to cool and the fruit remains in the solution approximately twenty-four hours, during which period a considerable amount of the sugar is absorbed by the fruit. The fruit is then removed from the solution and placed in fairly shallow pans, which are approximately half filled with a fresh syrup solution, care being taken, however, that the fruit is not completely submerged. The pans containing the fruit and the syrup are then placed in an ordinary dehydrator through which air is circulated under a temperature of 120° to 160° F., the temperature maintained depending upon the variety or size of fruit being candied. The partially exposed portion of the fruit is in this manner subjected to a drying action and as the moisture contained will escape in the direction of least resistance, it is obvious that the moisture will escape upwardly through the exposed portion of the fruit and that this exposed portion will become partially dry. The moisture evaporated by the drying action is gradually replaced by the sugar solution or the syrup, and as the fruit is turned from time to time, new surfaces are exposed to the drying action and the other surfaces which have been partially dried will thus more readily absorb the sugar. As the fruit is being dried, syrup is added as required and the drying operation is continued until the fruit does not absorb any more of the syrup.

The time required varies from twelve to twenty-four hours according to the variety and size of the fruit, and when the desired amount of sugar or syrup has been absorbed, it is only necessary to remove and dry the fruit just sufficient to give the product a somewhat dried appearance, when it may be packed in cartons or otherwise, for shipment to the market.

It will be noted from the foregoing that temperatures as low as possible are maintained during the entire operation; that is, the fruit is first pasteurized to completely destroy germs of fermentation. This is essential as it improves the keeping qualities of the fruit, and as care is taken that the fruit is not heated more than necessary to pasteurize it, discoloration and change of flavor do not take place to any material extent. Even lower temperatures are maintained during the drying operation and the natural flavor and color are thus maintained.

It has also been found that the partial drying of the exposed surfaces of the fruit permits a greater absorption of sugar or syrup, and the keeping qualities are thus further improved.

Any syrup solution may be employed; for instance, a syrup solution made from cane sugar, glucose, saccharine, etc., and it is also obvious that it is not absolutely essential that fresh fruit be employed, as actual practice has proved that any kind of canned fruit may be candied by the same process. Where canned fruit is employed, sterilization has already taken place and re-sterilization is therefore unnecessary. In other words, the canning of the fruit takes the place of the first step of the process.

It should also be understood that, while it has been stated that a dehydrator is employed during the drying operation, sun drying may be resorted to if desired.

Having thus described our invention, what we claim and desire to secure by Letters Patent is—

1. A method of manufacturing candied fruit, which consists in pasteurizing raw fruit, partially submerging the fruit when pasteurized in a syrup solution, subjecting the fruit when partially submerged to a drying action, intermittently turning the fruit while subjected to the drying action to permit the partially exposed dry surfaces to become submerged, and thereby absorb the syrup solution, continuing the drying and turning operation until the fruit has absorbed a predetermined amount of syrup, and then draining the fruit and partially drying the same.

2. A method of manufacturing candied fruit, which consists in pasteurizing raw fruit in a syrup solution, partially submerging the fruit when pasteurized in a syrup solution, subjecting the fruit partially submerged to a drying action, intermittently turning the fruit while subjected to the drying action to permit the partially exposed dry surfaces to become submerged, and thereby absorb the syrup solution, continuing the drying and turning operation until the fruit has absorbed a predetermined amount of syrup, and then draining the fruit and partially drying the same.

3. A method of manufacturing candied fruit, which consists in placing the raw fruit in a syrup solution, heating the solution to a pasteurizing temperature, cooling the syrup solution and retaining the fruit therein for a period of approximately twenty-four hours, removing and draining the fruit and placing it in comparatively shallow pans, applying a fresh solution of syrup to the fruit and just a sufficient quantity to permit partial submersion of the fruit, placing the pans containing the syrup and the partially submerged fruit in a dehydrator, circulating air therethrough at an approximate temperature of 140° F., so as to partially dry the exposed surfaces of the fruit, intermittently turning the fruit while subjected to the drying action to permit the partially dry surfaces to become submerged and thereby absorb the syrup solution, continuing the drying and turning operation until the fruit has absorbed a predetermined amount of syrup, and then removing the fruit from the dehydrator and draining and partially drying the same.

WILBER K. NICHOLS.
ELSIE P. NICHOLS.